(12) United States Patent
Ju et al.

(10) Patent No.: US 10,873,114 B2
(45) Date of Patent: Dec. 22, 2020

(54) SECONDARY BATTERY MODULE

(71) Applicant: SK Innovation Co., Ltd., Seoul (KR)

(72) Inventors: Seung Hoon Ju, Daejeon (KR); Kwan Yong Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 217 days.

(21) Appl. No.: 15/852,447

(22) Filed: Dec. 22, 2017

(65) Prior Publication Data
US 2018/0183119 A1   Jun. 28, 2018

(30) Foreign Application Priority Data

Dec. 23, 2016   (KR) ........................ 10-2016-0177899

(51) Int. Cl.
| | |
|---|---|
| *H01M 10/6554* | (2014.01) |
| *H01M 2/20* | (2006.01) |
| *H01M 10/6555* | (2014.01) |
| *H01M 2/10* | (2006.01) |
| *H01M 10/647* | (2014.01) |
| *H01M 10/613* | (2014.01) |
| *H01M 10/6551* | (2014.01) |
| *H01M 10/6556* | (2014.01) |
| *H01M 10/625* | (2014.01) |

(52) U.S. Cl.
CPC ..... *H01M 10/6554* (2015.04); *H01M 2/1077* (2013.01); *H01M 2/206* (2013.01); *H01M 10/613* (2015.04); *H01M 10/647* (2015.04); *H01M 10/6551* (2015.04); *H01M 10/6555* (2015.04); *H01M 10/6556* (2015.04); *H01M 10/625* (2015.04); *Y02T 10/7005* (2013.01)

(58) Field of Classification Search
CPC .......... H01M 10/6554; H01M 10/613; H01M 10/6551; H01M 10/6556; H01M 10/625; H01M 2/1077; H01M 2/206; H01M 10/6555; H01M 10/647
See application file for complete search history.

(56) References Cited

U.S. PATENT DOCUMENTS

| | | | |
|---|---|---|---|
| 9,023,508 B2 | 5/2015 | Seong et al. | |
| 9,461,344 B2 | 10/2016 | Lee et al. | |
| 2011/0318618 A1 | 12/2011 | Yajima et al. | |
| 2012/0040223 A1* | 2/2012 | Odumodu | H01M 2/1077 |
| | | | 429/120 |

(Continued)

FOREIGN PATENT DOCUMENTS

| | | | | |
|---|---|---|---|---|
| DE | 10 2008 059 961 | * | 6/2010 | ............. H01M 2/10 |
| KR | 1020060061486 A | | 6/2006 | |

(Continued)

*Primary Examiner* — Helen Oi K Conley
(74) *Attorney, Agent, or Firm* — The Webb Law Firm

(57) ABSTRACT

One embodiment of the present disclosure relates to a secondary battery module. A secondary battery module includes a plurality of battery cells; and a first frame configured to accommodate and cool the plurality of battery cells, wherein the first frame includes: a housing configured to accommodate the plurality of battery cells; and at least one cooling plate coupled to one surface of the housing, interposed between groups of one or more battery cells among the plurality of battery cells disposed in the housing, and configured to fix the plurality of battery cells and dissipate heat generated from the plurality of battery cells.

12 Claims, 7 Drawing Sheets

(56) References Cited

U.S. PATENT DOCUMENTS

| | | |
|---|---|---|
| 2013/0209858 A1 | 8/2013 | Schmitt et al. |
| 2015/0064535 A1 | 3/2015 | Seong et al. |
| 2015/0194714 A1 | 7/2015 | You et al. |
| 2015/0221996 A1 | 8/2015 | Jin |
| 2016/0126531 A1* | 5/2016 | Kim .................... H01M 2/1077 429/7 |
| 2017/0047620 A1 | 2/2017 | Lee et al. |
| 2018/0047954 A1 | 2/2018 | Yoo et al. |

FOREIGN PATENT DOCUMENTS

| | | | |
|---|---|---|---|
| KR | 1020110140070 A | 12/2011 | |
| KR | 1020120129968 A | 11/2012 | |
| KR | 1020130005756 A | 1/2013 | |
| KR | 101293952 B1 | 8/2013 | |
| KR | 101355961 B1 | 2/2014 | |
| KR | 1020140014413 A | 2/2014 | |
| KR | 10-1528007 * | 1/2015 | ............ H01M 10/60 |
| KR | 1020150052755 A | 5/2015 | |
| KR | 1020150111757 A | 10/2015 | |
| KR | 1020150123102 A | 11/2015 | |
| KR | 1020150127863 A | 11/2015 | |
| KR | 1020160077451 A | 7/2016 | |
| KR | 1020160115532 A | 10/2016 | |
| WO | 2016204489 A1 | 12/2016 | |

\* cited by examiner

10

SECONDARY BATTERY MODULE

CROSS-REFERENCE TO RELATED APPLICATION

This application claims priority to Korean Patent Application No. 10-2016-0177899 filed Dec. 23, 2016, the disclosure of which is hereby incorporated in its entirety by reference.

BACKGROUND OF THE INVENTION

Field of the Invention

An embodiment of the present disclosure relates to a secondary battery module.

Description of Related Art

Secondary batteries, which can be charged and discharged, are currently being studied due to development in cutting-edge fields such as digital cameras, cellular phones, notebooks, and hybrid vehicles. Secondary batteries may include nickel-cadmium batteries, nickel-metal hydride batteries, nickel-hydrogen batteries, and lithium secondary batteries. Among the above-described batteries, lithium secondary batteries are used as power sources in portable electronic devices at an operating voltage of 3.6 V or more, or used in high-output hybrid vehicles by connecting a plurality of the batteries in series, and since the lithium secondary batteries have an operating voltage three times higher and excellent energy density per unit weight compared to nickel-cadmium batteries or nickel-metal hydride batteries, lithium secondary batteries are being rapidly used.

A conventional secondary battery module includes battery cells 1, a cooling plate 2, and auxiliary structures which are partitions 3, a cover, and the like for fixing and protecting a secondary battery. As illustrated in FIG. 1, in the conventional secondary battery module, the cooling plate 2 is interposed between the adjacent battery cells 1, and the partitions 3 are disposed to fix the battery cells 1. The secondary battery module is formed by repeatedly forming the above structure, and since the partitions 3 and the like are disposed at the battery cells 1, a volume of the module increases and the number of components increases. Since the conventional secondary battery module has many structures such as a fixing structure and a protection structure, a workload and a volume thereof increase. Accordingly, the weight and bulk density of the secondary battery module have increased.

SUMMARY OF THE INVENTION

The present disclosure is directed to a secondary battery module in which the number of components is minimized by integrating cooling plates and a housing.

In addition, the present disclosure is directed to a secondary battery module in which cost is minimized by decreasing the number of assembly processes.

In addition, the present disclosure is directed to a secondary battery module in which positions of battery cells are fixed by locating supports on inner surfaces of bus bars without partitions for fixing the battery cells.

In addition, the present disclosure is directed to a secondary battery module in which the numbers of components and assembly processes may decrease by integrating bus bars and supports for fixing battery cells without additional partitions for fixing the battery cells.

According to an aspect of the present disclosure, there is provided a secondary battery module including: a plurality of battery cells, and a first frame configured to accommodate and cool the plurality of battery cells, wherein the first frame includes: a housing configured to accommodate the plurality of battery cells; and at least one cooling plate coupled to one surface of the housing, disposed after every one or more battery cells among the plurality of battery cells disposed in the housing, and configured to fix the plurality of battery cells and dissipate heat generated from the plurality of battery cells.

The housing and the cooling plate may be integrated to form the first frame.

A convex portion may be formed on one of the housing and the cooling plate, a concave portion is formed in the other thereof, and the convex portion and the concave portion may be assembled to couple the housing and the cooling plate.

The cooling plate may be formed of a thermally conductive material configured to dissipate heat generated from the battery cells.

The housing may be formed of a thermally conductive material configured to dissipate heat generated from the battery cells.

The cooling plate may be interposed between groups of two battery cells among the plurality of stacked battery cells and configured to be in contact with one side surface of each of the battery cells which are disposed at both sides of the cooling plate.

The cooling plate may be disposed after every third battery cell among the plurality of battery cells.

The housing may cover at least three surfaces among surfaces of the plurality of stacked battery cells from which electrode tabs are not withdrawn.

The housing may cover: outer surface of each battery cell located at both ends among the stacked plurality of battery cells; and one surface of upper and lower surfaces of the plurality of stacked battery cells.

The secondary battery module may further include a second frame configured to connect electrode tabs of the plurality of battery cells and fix the battery cells.

The second frame may include a bus bar interposed between electrode tabs of two battery cells adjacent to each other among the plurality of battery cells and configured to be in contact with the electrode tabs of the two battery cells adjacent to each other, and a support part configured to be in contact with the bus bar and fix positions of the two battery cells adjacent to each other.

The bus bar maybe formed in a bent plate shape and outer surfaces of side portions of the bus bar facing each other may be in contact with the electrode tabs of two battery cells adjacent to each other.

The support part may be interposed between the electrode tabs of the two battery cells adjacent to each other and configured to be in contact with an inner surface of the bus bar.

According to another aspect of the present disclosure, there is provided a secondary battery cooling frame including: a housing configured to accommodate a plurality of battery cells; and at least one cooling plate assembled on one surface of the housing, interposed between groups of at least one battery cell among the plurality of battery cells disposed in the housing, configured to fix the plurality of battery cells and dissipate heat generated from the plurality of battery cells, wherein a convex portion is formed on one of the housing and the cooling plate, a concave portion is formed in the other thereof, the convex portion and the concave portion are assembled, and the housing is coupled to the cooling plate to accommodate and cool the plurality of stacked battery cells.

According to still another aspect of the present disclosure, there is provided a secondary battery cooling frame including: a housing configured to accommodate a plurality of battery cells; and at least one cooling plate integrated with one surface of the housing, interposed between groups of at least one battery cell among the plurality of battery, and configured to fix the plurality of battery cells and dissipate heat generated from the plurality of battery cells.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DESCRIPTION OF THE INVENTION

Hereinafter, specific embodiments of the present disclosure will be described with reference to the accompanying drawings. However, the embodiments are only examples and the disclosure is not limited thereto.

In descriptions of the disclosure, when it is determined that detailed descriptions of related well-known technology unnecessarily obscure the gist of the disclosure, the detailed descriptions will be omitted. Terms described below are defined by considering functions in the disclosure and meanings may vary depending on, for example, a user or operator's intentions or customs. Therefore, the meanings of the terms should be interpreted based on the scope throughout this specification.

The technological spirit of the present disclosure is defined by the appended claims, and the following embodiments are only made to efficiently describe the technological spirit of the disclosure to those skilled in the art.

Figure 1:
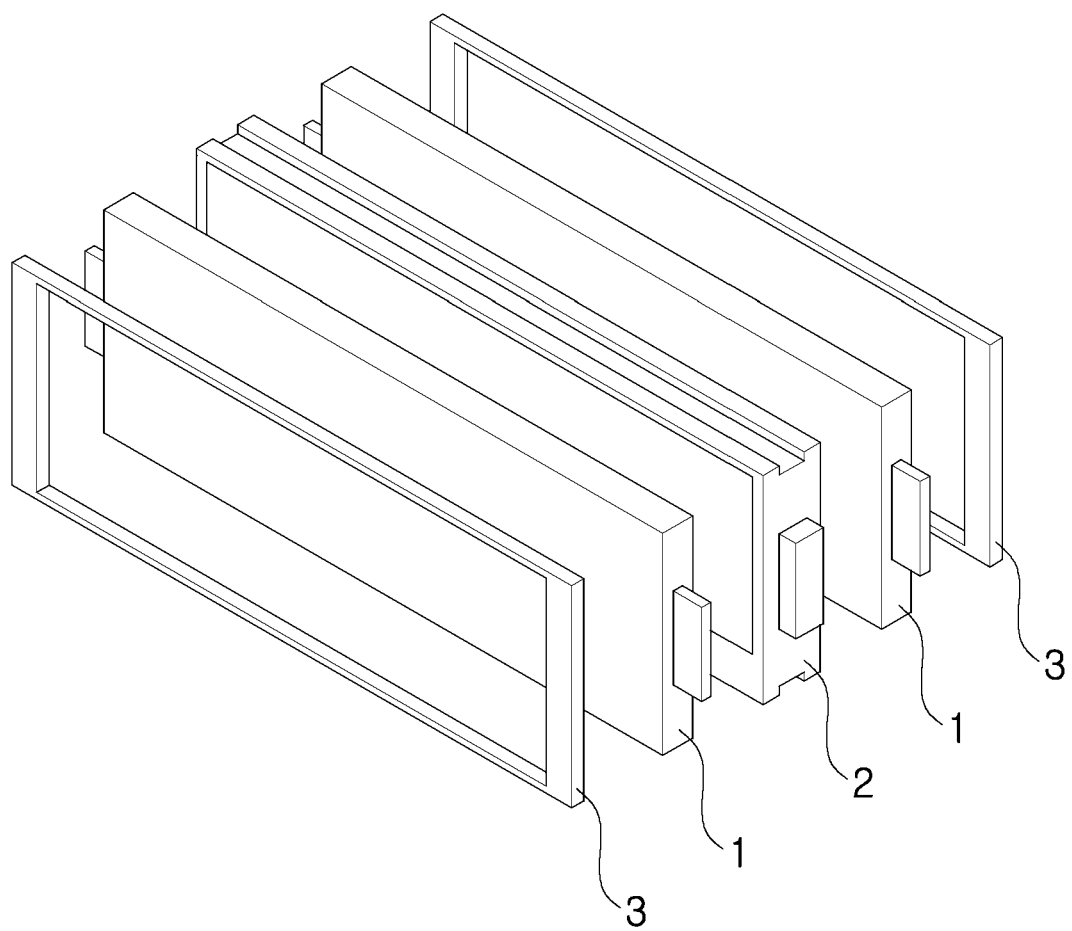
FIG. 1 is a view illustrating a conventional secondary battery.
Figure 2:
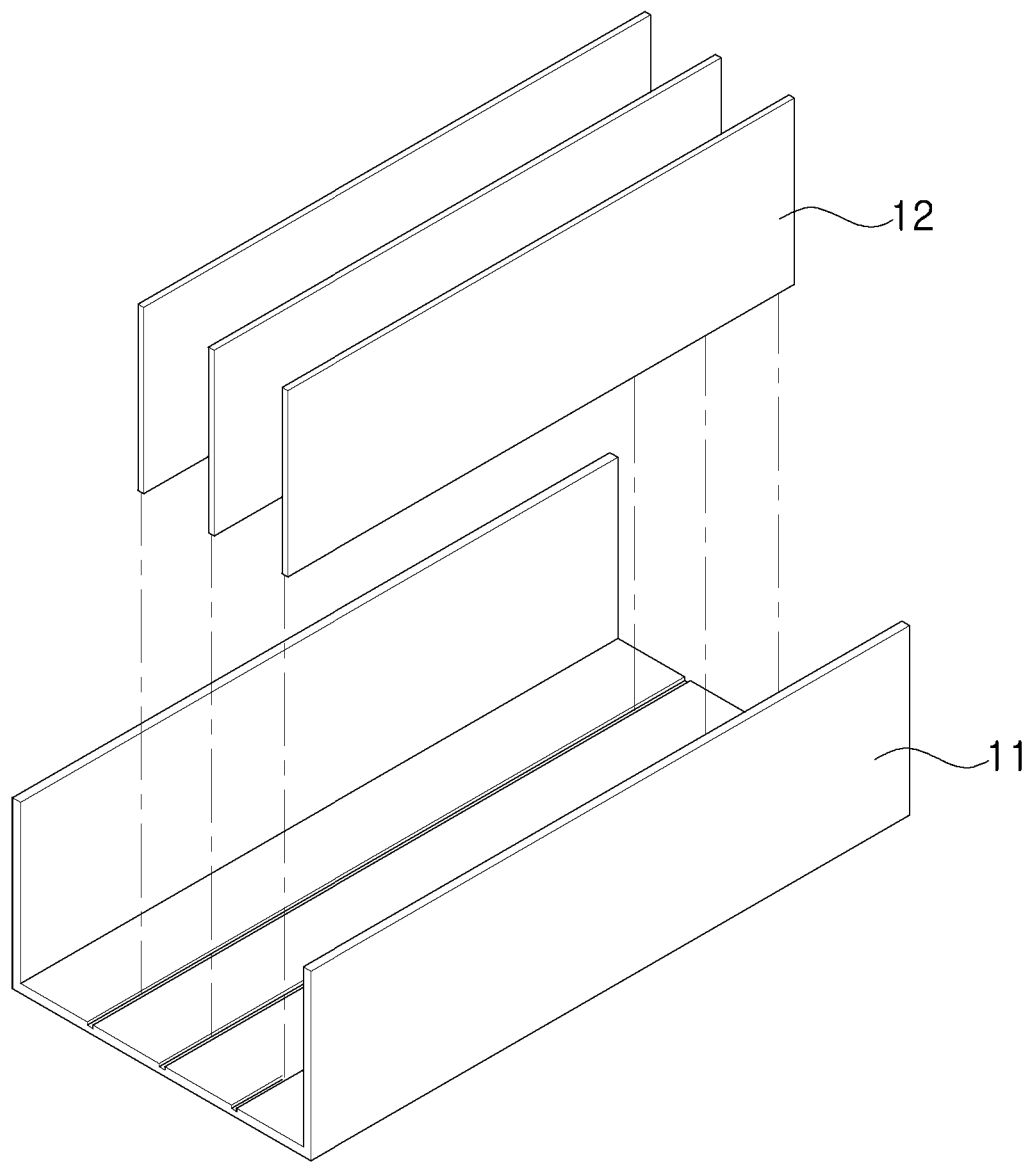
FIG. 2 is a view illustrating a first frame according to one embodiment of the present disclosure.
Figure 3:
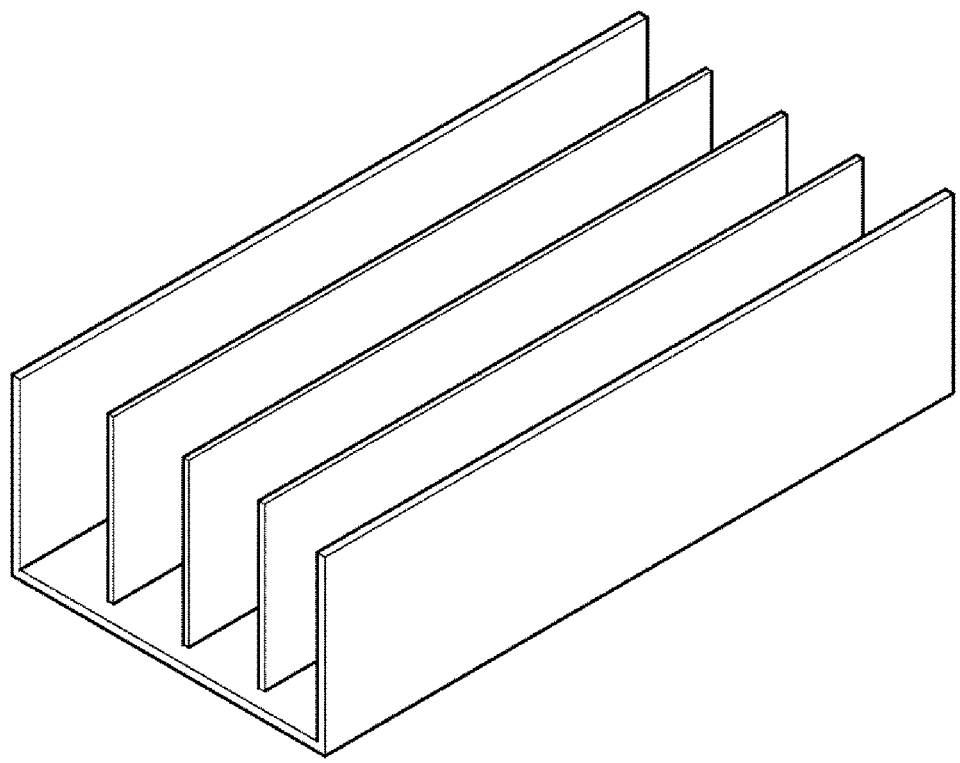
FIG. 3 is a view illustrating a first frame according to one embodiment of the present disclosure.

FIGS. 2 and 3 are views illustrating a first frame according to one embodiment of the present disclosure.

FIG. 2 is the view illustrating a housing 11 and cooling plates 12 which are formed through an assembly method and the housing 11 and the cooling plates 12 are coupled through assembly, and FIG. 3 is a view illustrating a housing 11 and cooling plates 12 which are integrally formed.

Referring to FIG. 2, a secondary battery module according to the embodiment of the present disclosure may include a first frame 10 capable of accommodating and cooling secondary batteries 20 including battery cells 21 and electrode tabs 22. The first frame 10 may include the housing 11 and the cooling plates 12. The housing 11 and the cooling plates 12 may be assembled to be the first frame 10. However, the forming of the first frame 10 is not limited to assembling the housing 11 and the cooling plates 12, and the first frame 10 may be formed by integrating the housing 11 and the cooling plates 12 as illustrated in FIG. 3.

As illustrated in FIG. 2, convex portions 121 and concave portions 111 may be formed and assembled to couple the cooling plates 12 and the housing 11 in the case in which the cooling plates 12 are assembled on the housing 11. As illustrated in FIG. 3, in the case in which the housing 11 and the cooling plates 12 are integrally formed, the housing 11 and the cooling plates 12 may be formed by an injection molding process. The housing 11 and the cooling plates 12 may be integrally formed in a manufacturing process thereof.

The battery cells 21 may be accommodated in the housing 11. A plurality of battery cells 21 may be stacked and disposed in the housing 11. The housing 11 may serve as a cover configured to support and protect the plurality of stacked battery cells 21.

The housing 11 may cover at least three surfaces among surfaces of the plurality of stacked battery cells 21 from which the electrode tabs 22 are not withdrawn from the battery cells 21. For example, the housing 11 may cover a lower side of each of the plurality of stacked battery cells 21 (that is, one of both sides of the battery cell 21 provided in a direction perpendicular to a direction in which the battery cells 21 are stacked) and both sides of the plurality of stacked battery cells 21 (that is, outer sides of both outermost battery cells 21 among the plurality of stacked battery cells 21). Hereinafter, the housing will be described as covering the lower sides and both sides of the battery cells 21, but is not limited thereto, and the housing 11 may cover upper sides and both sides thereof. The housing 11 may be formed to have a structure configured to cover three side surfaces of the stacked battery cells 21 and support and protect the stacked battery cells 21.

In addition, the housing 11 may be formed of a cooling plate. The housing 11 formed of the cooling plate may dissipate heat generated by the battery cells 21. Accordingly, the housing 11 may simultaneously support and cool the stacked battery cells 21. When the housing 11 is formed of the cooling plate, the housing 11 may be formed of a thermally conductive material which dissipates heat generated by the battery cells 21. For example, the housing 11 may be formed of aluminum.

A plurality of cooling plates 12 may be coupled to one inner surface of the housing 11 in which the battery cells 21 are accommodated.

The cooling plates 12 may be assembled on or integrated with one inner surface of the housing 11 in which the battery cells 21 are accommodated. Each of the cooling plates 12 may be interposed between side surfaces of battery cells 21 adjacent to the cooling plate in a direction in which the battery cells 21 are stacked. The cooling plate 12 may be positioned between groups of at least one battery cell 21 among the plurality of stacked battery cells 21 and configured to be in contact with one side surface of the battery cells 21 which are disposed at both sides of the cooling plate 12.

The cooling plates 12 may be formed of a thermally conductive material which dissipates heat generated by the battery cells 21. For example, the cooling plates 12 may be formed of aluminum.

A length of the cooling plate 12 is less than a length between both side surfaces of the housing 11, and thus the electrode tabs 22 of the plurality of battery cells 21 disposed in the housing 11 may be connected to each other.

In the secondary battery module according to the embodiment of the present disclosure, the housing 11 and the cooling plates 12 which are assembled or integrated in a manufacturing process thereof may fix or support the battery cells 21 and cool the battery cell 21. In the case in which the housing 11 is formed of a cooling plate, the housing 11 may cool the battery cells 21 from the lower or upper side of the battery cells 21, and the cooling plates 12 may cool side surfaces of the battery cells 21.

Although not illustrated in the drawings, at least one of the housing 11 and the cooling plates 12 may include a cooling path through which cooling water flows or a heat sink plate for cooling with air.

Figure 4:
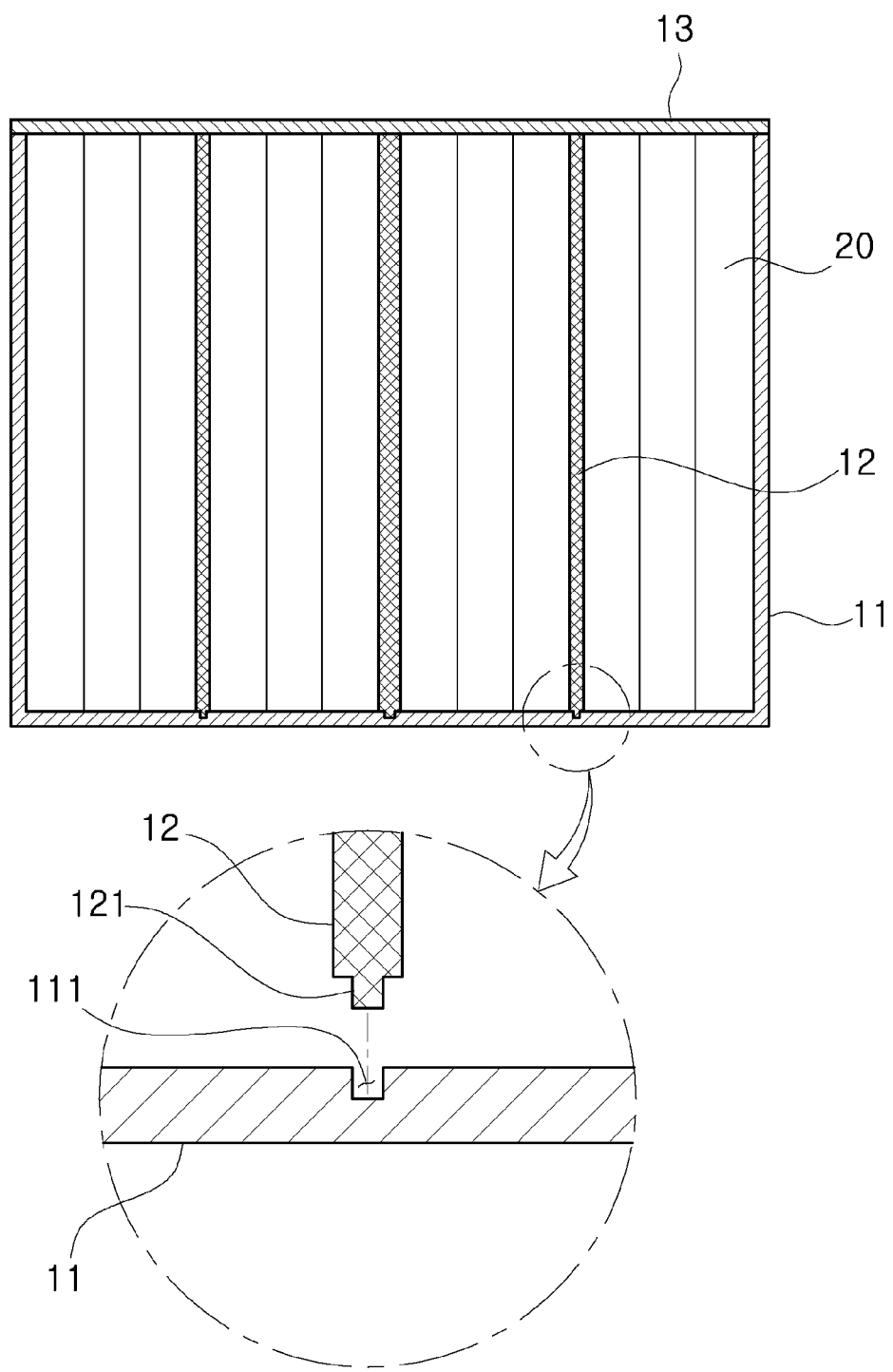
FIG. 4 is a sectional view illustrating secondary batteries disposed in the first frame according to one embodiment of the present disclosure.

FIG. 4 is a sectional view illustrating secondary batteries disposed in the first frame according to one embodiment of the present disclosure.

Referring to FIG. 4, the plurality of battery cells 21 may be stacked and disposed in the housing 11, and the cooling plates 12 may be positioned between the stacked battery cells 21. The cooling plates 12 interposed between the battery cells 21 may be coupled to the housing 11.

The plurality of cooling plates 12 may be coupled to the housing 11 according to predetermined distances between the plurality of cooling plates 12. The battery cells 21 may be disposed according to the predetermined distances. Accordingly, the predetermined distances may be determined on the basis of the number of the battery cells 21. For example, the cooling plate 12 may be interposed between groups of at least one battery cells 21 among the plurality of stacked battery cells 21. For example, as illustrated in FIG. 4, the cooling plate 12 may be interposed between groups of three battery cells 21.

According to the embodiment illustrated in FIG. 2, in the case in which the housing 11 and the cooling plates 12 are coupled through assembly, the convex portions 121 may be formed on one of the housing 11 and the cooling plates 12 and the concave portions 111 may be formed in the other thereof to assemble the cooling plates 12 to the housing 11. For example, the housing 11 may include concave portions 111 and the cooling plates 12 may include the. the convex portions 121. A partially exploded view of the FIG. 4 shows each of the convex portions 121 and each of the corresponding concave portions 111. The convex portion 121 and the concave portion 111 may be formed to correspond to each other. Accordingly, the concave portion 111 may be fixedly coupled to the convex portion 121. However, the housing 11 is not limited to including the concave portions 111 and the cooling plates 12 are not limited to including convex portions 121. The convex portions 121 may also be formed in the housing 11 and the concave portions 111 may be formed on the cooling plates 12. The concave portions 111 may be formed in the housing 11 at positions corresponding to the cooling plates 12. The housing 11 and the cooling plates 12 may be assembled and coupled by the convex portions 121 and the concave portions 111.

The cooling plates 12 coupled to the housing 11 may simultaneously cool and fix the battery cell 21. Accordingly, even though additional partitions are not provided in the first frame 10, the battery cells 21 may be fixed by the housing 11 and the cooling plates 12.

The first frame 10, in which the cooling plates 12 are coupled to the housing 11 or the housing 11 is integrated with the cooling plate 12, may fix and cool the battery cells 21. Since the first frame 10 may simultaneously perform functions of fixing and cooling the battery cell 21, there is an effect in that the number of components and processes decrease. Accordingly, a manufacturing cost of the secondary battery may decrease.

Figure 5:
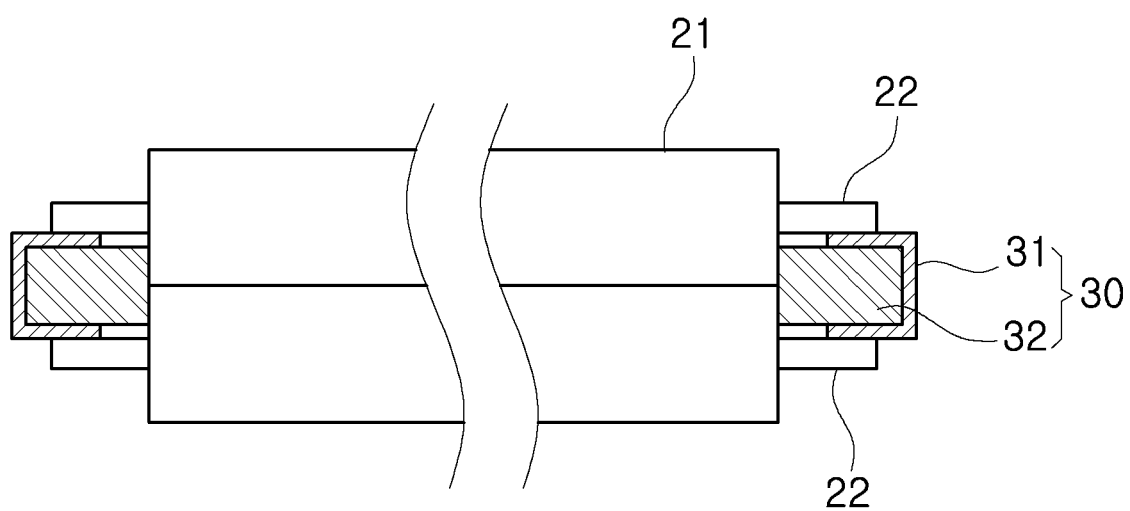
FIG. 5 is a sectional view illustrating a second frame disposed in the secondary battery according to one embodiment of the present disclosure.

FIG. 5 is a sectional view illustrating a second frame disposed in the secondary battery according to one embodiment of the present disclosure.

Referring to FIG. 5, adjacent battery cells 21 among the plurality of stacked battery cells 21 may be electrically connected by second frames 30. Each of the second frames 30 may electrically connect the adjacent battery cells 21 and the second frames 30 may fix the battery cells 21. The second frames 30 may include bus bars 31 and supports part 32.

Each of the bus bars 31 may be in contact with the electrode tabs 22 of the adjacent battery cells 21 and may electrically connect the adjacent battery cells 21. The bus bar 31 may be interposed between the electrode tabs 22 of the adjacent battery cells 21 among the plurality of battery cells 21, and may be in contact with each of the electrode tabs 22. The bus bar 31 may be formed in a "⊏" shape to be in contact with and electrically connect the adjacent electrode tabs 22. The electrode tabs 22 of the adjacent battery cells 21 may be in contact with outer surfaces of side portions of the bus bar 31, which face the electrode tabs 22.

Each of the supports part 32 for fixing the battery cells 21 may be inserted into an inner surface of the bus bar 31.

The support part 32 may be fixedly inserted into the bus bar 31 and may fix a position of the battery cell 21. The support part 32 may be interposed between the adjacent electrode tabs 22 and be in contact with the inner surface of the bus bar 31. The support part 32 may be formed to have a thickness allowing the support part 32 to be fixedly inserted into the inner surface of the bus bar 31. In a state in which the support part 32 is fixedly inserted into the bus bar 31, the support part 32 may be fixedly in contact with the battery cell 21.

The second frame 30 has a structure in which the bus bar 31 configured to electrically connect the adjacent battery cells 21 and the support part 32 configured to fix the battery cells 21 are coupled. The second frame 30 has the structure in which the bus bar 31 configured to electrically connect the battery cells 21 is coupled to the support part 32 configured to fix the battery cells 21. Accordingly, additional partitions for fixing the battery cells do not have to be used, the number of components may be minimized, and thus the number of assembly processes may be decreased. Accordingly, a manufacturing cost of the secondary battery may be decreased.

In addition, the second frame 30 may be further provided with a protective member at a side opposite a side at which the second frame 30 is in contact with the electrode tab 22. Accordingly, the second frame 30 may also serve as a protective member configured to protect the secondary battery module.

Figure 6:
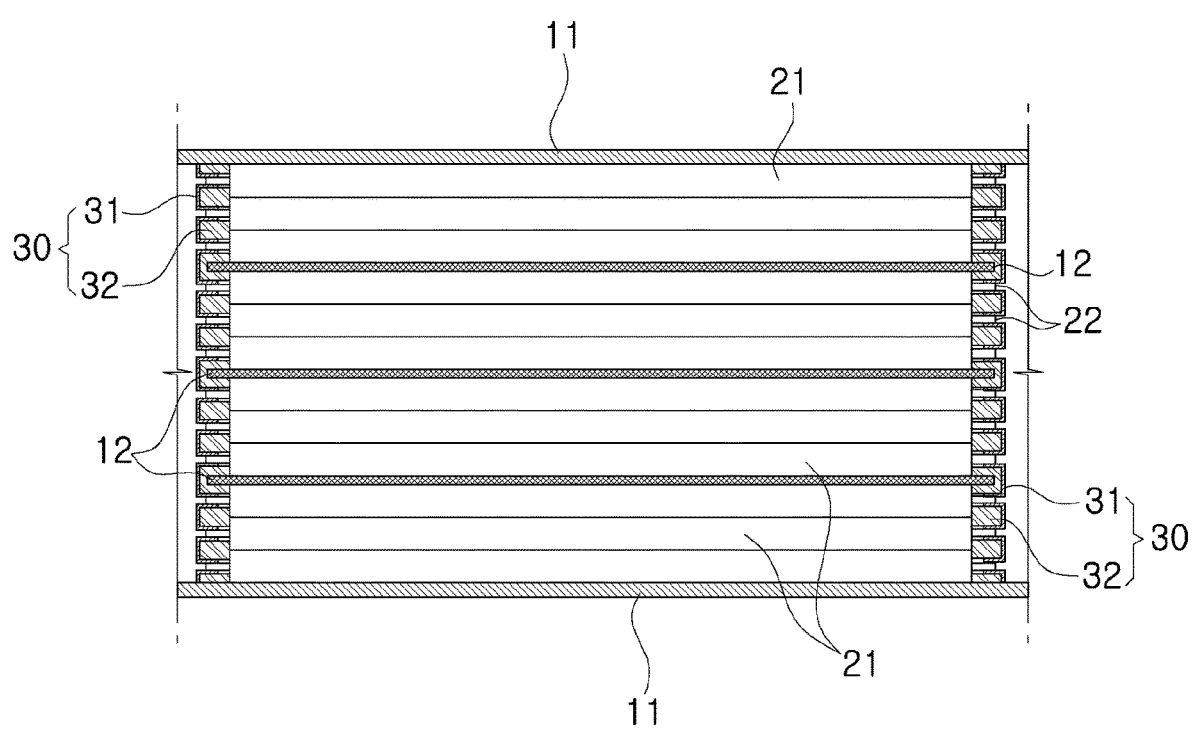
FIG. 6 is a view illustrating a secondary battery module including the first frame and the second frames according to one embodiment of the present disclosure.

FIG. 6 is a view illustrating a secondary battery module including the first frame and the second frames according to one embodiment of the present disclosure.

Referring to FIG. 6, the plurality of stacked battery cells 21 may be disposed in the housing 11, and the cooling plate 12 may be positioned between groups of three battery cells 21. The first frame 10 including the housing 11 and the cooling plates 12 may fix and cool the battery cells 21.

In addition, the second frame 30 may be disposed at both sides of the battery cell 21 from which the electrode tabs 22 are withdrawn. The bus bar 31 may be interposed between the electrode tabs 22 of the adjacent battery cells 21, and the support part 32 fixedly inserted into the inner surface of the bus bar may be fixedly in contact with the battery cell 21. Here, the electrode tabs 22 located at the same side of the both sides of the battery cells 21 may have the same polarity (a positive or negative electrode). Accordingly, the battery cells 21 may be connected in parallel by the bus bars 31.

The first frame 10 may fix the battery cells 21 at positions in a direction in which the battery cells 21 are stacked, and the second frames 30 may fix the battery cells 21 at both sides from which the electrode tabs 22 are withdrawn. Accordingly, the battery cells 21 may be fixed by the first frame 10 and the second frames 30 without additional partitions.

When the secondary batteries 20, the first frame 10, and the second frames 30 are coupled, the cooling plates 12 may be fixed to the supports part 32. Accordingly, grooves (not shown) may be formed in the supports part 32 corresponding to positions, in which the cooling plates 12 are disposed, in order to match thicknesses of the cooling plates 12 so that the cooling plates 12 may be fixed. The cooling plates 12 may be inserted into the grooves formed in the supports part 32 and the cooling plate 12 may be additionally fixed.

Figure 7:
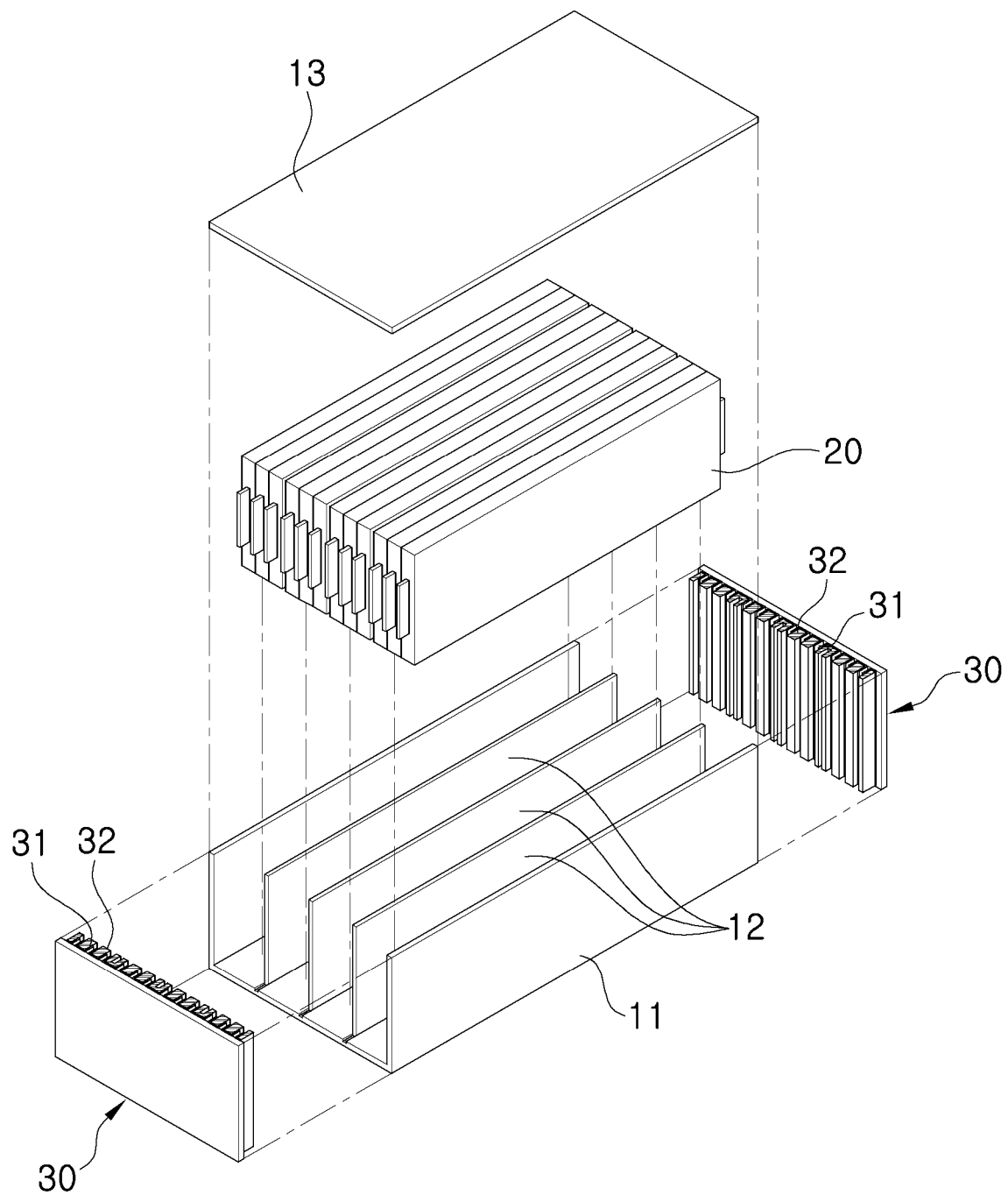
FIG. 7 is an exploded view illustrating the secondary battery module including the first frame and the second frames according to one embodiment of the present disclosure.

FIG. 7 is an exploded view illustrating the secondary battery module including the first frame and the second frames according to one embodiment of the present disclosure.

Referring to FIG. 7, the plurality of secondary batteries 20 may be stacked in the first frame 10 including the cooling plates 12 in the housing 11.

After the secondary batteries 20 are disposed in the first frame 10, the second frames 30 may be coupled to the secondary batteries 20. The first frame 10 may cover the lower sides of the secondary batteries 20 and both sides thereof from which the electrode tabs 22 are not withdrawn. The second frames 30 may be disposed at sides of the secondary batteries 20 from which the electrode tabs 22 of the secondary batteries 20 are withdrawn. The second frames 30 may electrically connect the battery cells 21 and fix the positions of the battery cells 21.

After the second frames 30 are coupled to the secondary batteries 20, a cover 13 may be disposed above the secondary batteries 20. In addition, an additional protective member may be disposed on outer surfaces of the second frames 30 and protect the secondary battery module according to one embodiment of the present disclosure. The secondary battery module according to one embodiment of the present disclosure is not be limited to the first frame 10, the secondary batteries 20, and the second frames 30, and may include additional components.

As described above, a secondary battery module which can minimize the number of components by integrating cooling plates and a housing of the secondary battery can be provided.

In addition, a secondary battery module can be provided in which cost can be decreased by decreasing the number assembly processes thereof.

In addition, a secondary battery module can be provided in which positions of battery cells can be fixed by positioning supports on inner surfaces of bus bars without partitions for fixing the battery cell.

In addition, a secondary battery module can be provided in which the numbers of components and assembly processes can be decreased by integrating bus bars and supports for fixing battery cells without additional partitions for fixing the battery cells.

While the representative embodiments of the preset disclosure have been described above in detail, it may be understood by those skilled in the art that the embodiments may be variously modified without departing from the scope of the present disclosure. Therefore, the scope of the present disclosure is defined not by the described embodiment but by the appended claims, and encompasses equivalents that fall within the scope of the appended claims.

REFERENCE NUMERALS

10: FIRST FRAME
11: HOUSING
111: CONCAVE PORTION
12: COOLING PLATE
121: CONVEX PORTION
13: COVER
20: SECONDARY BATTERY
21: BATTERY CELL
22: ELECTRODE TAB
30: SECOND FRAME
31: BUS BAR
32: SUPPORT PART

What is claimed is:

1. A secondary battery module comprising:
a plurality of battery cells; and
a first frame configured to accommodate and cool the plurality of battery cells,
wherein the first frame includes:
 a housing having a lower portion covering a lower portion of the plurality of battery cells and a pair of side portions integrally formed on the lower portion to cover an outer side of an outermost battery cell among the plurality of battery cells, the housing having a space formed between the pair of side portions for accommodating the plurality of battery cells adjacent the lower portion and the pair of side portions; and
 at least one plate disposed in between at least one pair of battery cells of the plurality of battery cells in the space formed between the pair of side portions and to support the plurality of battery cells, wherein the at least one plate is coupled to the lower portion of the housing to partition the space formed between the pair of side portions into at least two spaces, wherein the at least one plate is interposed between groups of two battery cells among the plurality of battery cells and configured to be in contact with one side surface of each battery cell of a group of two battery cells;
a second frame configured to connect electrode tabs of the plurality of battery cells and fix the battery cells and first frame, wherein the second frame includes:
 a bus bar interposed between electrode tabs of adjacent battery cells and comprising inner portions that surrounds the ends of the at least one plate, the bus bar configured to be in contact with the electrode tabs of the battery cells adjacent to each other, wherein outer surfaces of side portions of the bus bar facing each other are in contact with the same electrode tab of a battery cell.

2. The secondary battery module of claim 1, wherein the housing and the at least one plate are integrally formed.

3. The secondary battery module of claim 1, wherein:
a convex portion is formed on one of the housing and the at least one plate; and
a concave portion is formed in the other thereof;
wherein the convex portion and the concave portion are assembled to couple the housing and the at least one plate.

4. The secondary battery module of claim 1, wherein the at least one plate is formed of a thermally conductive material configured to dissipate heat generated from the battery cells.

5. The secondary battery module of claim 1, wherein the housing is formed of a thermally conductive material configured to dissipate heat generated from the battery cells.

6. The secondary battery module of claim 1, wherein the at least one plate is disposed after every third battery cell among the plurality of battery cells.

7. The secondary battery module of claim 1, wherein the housing covers at least three surfaces among surfaces of the plurality of battery cells from which electrode tabs are not withdrawn.

8. The secondary battery module of claim 1, wherein the housing covers:
an outer surface of each battery cell located at both ends among the plurality of battery cells; and
one surface of upper and lower surfaces of the plurality of battery cells.

9. The secondary battery module of claim 1, wherein the second frame includes:
a support part configured to be in contact with the bus bar and fix positions of two battery cells adjacent to each other.

10. The secondary battery module of claim 9, wherein:
the bus bar is formed in a bent plate shape.

11. The secondary battery module of claim 9, wherein the support part is interposed between the electrode tabs of the two battery cells adjacent to each other and configured to be in contact with an inner surface of the bus bar.

12. A secondary battery cooling frame comprising:
a first frame having a lower portion covering a lower portion of a plurality of battery cells and a pair of side portions integrally formed on the lower portion to cover an outer side of an outermost battery cell among the plurality of battery cells, the first frame having a space formed between the pair of side portions for accommodating the plurality of battery cells by the lower portion and the pair of side portions; and
wherein the first frame comprises at least one plate disposed in between at least one pair of battery cells of the plurality of battery cells in the space formed between the pair of side portions and to support the plurality of battery cells, wherein the at least one plate is coupled to the lower portion of the first frame to partition the space formed between the pair of side portions into at least two spaces wherein:
a convex portion is formed on one of the lower portion of the first frame and the at least one plate;
a concave portion is formed in the other thereof; and
the convex portion and the concave portion are assembled, and the first frame is coupled to the at least one plate to accommodate and cool the plurality of battery cells; and
a second frame configured to connect electrode tabs of the plurality of battery cells and fix the battery cells and the first frame, wherein the second frame includes:
a bus bar interposed between electrode tabs of adjacent battery cells and comprising inner portions that surround the ends of the at least one plate, the bus bar configured to be in contact with the electrode tabs of the battery cells adjacent to each other, wherein outer surfaces of side portions of the bus bar facing each other are in contact with the same electrode tab of a battery cell.

* * * * *